US008914726B2

(12) United States Patent
Mollitor et al.

(10) Patent No.: US 8,914,726 B2
(45) Date of Patent: Dec. 16, 2014

(54) VISUALIZING A COMPLEX NETWORK BASED ON A SET OF OBJECTS OF INTEREST (75) Inventors: Robert C. Mollitor, Rockville, MD (US); Yevgeny Gurevich, Washington, DC (US); Vivek Narayanan, Colorado Springs, CO (US); Patrick J. Malloy, Washington, DC (US)

(73) Assignee: Riverbed Technology, Inc., San Francisco, CA (US)

( * ) Notice: Subject to any disclaimer, the term of this patent is extended or adjusted under 35 U.S.C. 154(b) by 2206 days.

(21) Appl. No.: 11/503,555

(22) Filed: Aug. 11, 2006

(65) Prior Publication Data
US 2007/0044032 A1 Feb. 22, 2007

Related U.S. Application Data (60) Provisional application No. 60/709,724, filed on Aug. 20, 2005.

(51) Int. Cl.
*G06F 15/177* (2006.01)
*H04L 12/24* (2006.01)
(52) U.S. Cl.
CPC .............. *H04L 41/22* (2013.01); *H04L 41/145* (2013.01)
USPC ........... 715/734; 715/736; 715/737; 715/738; 715/790; 715/815
(58) Field of Classification Search
USPC .......................................................... 715/734
See application file for complete search history.

(56) References Cited

U.S. PATENT DOCUMENTS

| | | | | |
|---|---|---|---|---|
| 6,112,015 A | * | 8/2000 | Planas et al. | 709/223 |
| 6,219,053 B1 | | 4/2001 | Tachibana et al. | |
| 6,300,957 B1 | * | 10/2001 | Rao et al. | 345/441 |
| 6,393,425 B1 | | 5/2002 | Kelly | |
| 6,900,822 B2 | | 5/2005 | Germain et al. | |
| 7,124,369 B2 | * | 10/2006 | Beaudoin | 715/738 |
| 7,207,012 B1 | * | 4/2007 | House et al. | 715/853 |
| 7,519,700 B1 | * | 4/2009 | Sapsford et al. | 709/223 |
| 2002/0135610 A1 | | 9/2002 | Ootani et al. | |
| 2002/0147809 A1 | | 10/2002 | Vinberg | |
| 2003/0067481 A1 | * | 4/2003 | Chedgey et al. | 345/738 |
| 2003/0184599 A1 | * | 10/2003 | Beaudoin | 345/853 |
| 2004/0008622 A1 | | 1/2004 | Dolbec et al. | |
| 2004/0085345 A1 | * | 5/2004 | Galou et al. | 345/734 |
| 2004/0150644 A1 | | 8/2004 | Kincaid et al. | |
| 2005/0120030 A1 | | 6/2005 | Varpela et al. | |
| 2005/0149312 A1 | * | 7/2005 | McGaughy | 703/14 |
| 2005/0179684 A1 | * | 8/2005 | Wallace | 345/419 |
| 2006/0048077 A1 | * | 3/2006 | Boyles et al. | 715/853 |

* cited by examiner

*Primary Examiner* — Doon Chow
*Assistant Examiner* — Anil N Kumar
(74) *Attorney, Agent, or Firm* — Park, Vaughan, Fleming & Dowler LLP (57) ABSTRACT A user interface of a device for displaying a representation of a network of objects wherein a plurality of selectable objects are rendered, and each of the plurality of selectable objects are rendered having a given positioning relative to each other of the plurality of selectable objects. One or more edges are rendered interconnecting the plurality of selectable objects within a first region of the user interface. A second region is rendered in response to one or more of the selectable objects of the first region being selected. Objects corresponding to the selected objects are depicted in the second region while maintaining the given relative positioning. A number of additional objects may be retrieved from a database that indicates objects that are adjoining the corresponding objects. The adjoining objects are positioned in the second region and are interconnected to the corresponding objects by one or more additional edges.

20 Claims, 7 Drawing Sheets

VISUALIZING A COMPLEX NETWORK BASED ON A SET OF OBJECTS OF INTEREST

This application claims the benefit of U.S. Provisional Patent Application No. 60/709,724, filed Aug. 20, 2005.

BACKGROUND AND SUMMARY OF THE INVENTION

The present system relates to the field of network simulation and particularly to visualization of a computer network.

Computers are today used extensively by users to implement many applications. Users interact through a user interface (UI) provided by an application running on the computer. The visual environment is displayed by the computer on a display device and the user is provided with an input device to influence events or images depicted on the display. UI's present visual images which describe various visual metaphors of an operating system, an application, etc. implemented on the computer.

The user typically moves a user-controlled object, such as a cursor or pointer, across a computer screen and onto other displayed objects or screen regions, and then inputs a command to execute a given selection or operation. Other applications or visual environments also may provide user-controlled objects such as a cursor for selection and manipulation of depicted objects in either of a two-dimensional or three-dimensional space.

The user interaction with and manipulation of the computer environment is achieved using any of a variety of types of human-computer interface devices that are connected to the computer controlling the displayed environment. A common interface device for UI's is a mouse or trackball. A mouse is moved by a user in a planar workspace to move an object such as a cursor on the two-dimensional display screen in a direct mapping between the position of the user manipulation and the position of the cursor. This is typically known as position control, where the motion of the object directly correlates to motion of the user manipulation.

An example of such a UI is a UI for depicting/manipulating network connections to assist a user, such as a network administrator, to visualize and maintain vast arrays of networked devices. A typical visualization of a computer network is a two-dimensional graph where the vertices correspond to devices and the edges correspond to physical links or connections. The edges may also or alternatively correspond to non-physical associations or dependencies. By the visualization of network devices and links within a suitable UI, an operator may readily get an overview of network operations including communication load, service availability, network collisions, and/or other network related information.

Small networks, such as within a household or office building may be readily visualized with desired information that is easily discernable. However, for larger networks, a common problem is that the scale and complexity of the visualization, such as a graph, make it difficult to focus on particular components within the graph. One common way to address this complexity is to subdivide the graph into sub-graphs based on some criteria such as physical proximity. For example, all of the devices in a building, city, or other proximity condition, may be represented in a second graph. The second graph may indicate relevant details for that proximity condition (e.g., building, city, etc.). The first graph may now be modified to just have a single replacement vertex that represents all of the elements in the second graph. All edges that did connect the remaining elements in the first graph to elements now in the second graph can instead be modified to connect to the replacement vertex.

In this way, a large complex graph may be broken up into a collection of simpler, hierarchically-related sub-graphs. This arrangement allows the user to view the network at different levels of detail with the more detailed views only showing, in this example, proximate neighbors. As may be readily appreciated, the hierarchy may be defined based on criteria other than proximity. However, to the extent that the hierarchy is statically defined, it will interfere with the simultaneous viewing of devices that happen to have different criteria values. For example, if the hierarchy is based on proximity, it may not be possible to see two devices from different proximities at the same time. Even in a flat network, without any hierarchy, it may be difficult to provide a focused view of devices on opposite ends of the visual representation because of all of the potentially intervening vertices and edges. Either the user must zoom out to see everything at once, which may cause a lot of overlap in the visual representation, or the user must scroll the display window back and forth, which is cumbersome and may not enable a desired overview and comparison of the network and network components. With hierarchical sub-graphs, it may be necessary to open more than one window, each displaying a different sub-graph representation, to see distant objects at the same time. Further, even the reduced detail provided by the sub-graphs may obscure particular devices and/or interconnections of interest. In addition, different portions of the graph of interest may not be selectable using fixed criteria, such as proximity conditions and given sub-graphs may not provide a desired level of context.

It is an object of the present system to overcome disadvantages and/or make improvements in the prior art.

The present system includes a system, method and device for producing a user interface of a device for displaying a visual representation of a network of objects. In operation, a plurality of selectable objects are rendered, wherein each of the plurality of selectable objects are depicted having a given positioning relative to each other of the plurality of selectable objects. One or more edges are depicted interconnecting the plurality of selectable devices within a first region of the user interface. A second region is rendered in response to one or more of the selectable objects of the first region being selected, wherein featured objects corresponding to the selected objects are rendered in the second region while maintaining the given relative positioning of the corresponding selected object. In response to a selected object, a number of additional objects, namely associate objects, are retrieved from a database that indicates objects that are adjoining the feature objects. The associate objects are positioned in the second region without substantially changing the given relative positioning of the feature objects. The associate objects depicted in the second region are interconnected to the feature objects by one or more additional edges.

The present system provides a system for displaying and interacting with a partial, but dynamic, representation of a network of objects in the second region in conjunction with a static representation in the first region. In operation, the display may be configured to show either representation or it may be split into a plurality of regions (first region, second region, etc.), each displaying one form of either representation. The static representation provided in the first region may display all of the network objects from a single network sub-graph as selectable vertices and edges. The dynamic representation provided in the second region displays some number of network objects from any of the statically defined sub-graphs also as selectable vertices and edges but not necessarily as a fully connected sub-graph. The set of objects displayed in the dynamic representation consists of explicitly featured objects (e.g., selected objects) and implicitly-determined associate objects. In accordance with the present system, the positioning of objects in the dynamic representation is automatically determined whenever the user features (e.g., selects objects from the first region) or unfeatures objects.

Typically, the user decides which objects are to be featured in the dynamic representation. For example, the user may select one or more objects in the static representation and then run a featuring operation. Alternatively, the user may run some content-based selection operation and then feature the results. When the set of featured objects is changed, the system may automatically pick the set of associate objects based on default or user specified system settings. For example, the system may be configured to consider the objects whose vertices are one edge away from the vertices of at least one featured object, as well as the objects represented by the connecting edges, as associate objects. A larger set of associate objects may result from considering objects at more than two or three edges away in the graph. By displaying associate objects and connecting them to the featured objects, the system provides a visual context to help the user understand where the featured objects belong in the sub-graphs. Further, by considering the connections between objects in different static sub-graphs of a hierarchical network graph, the system can show the context within the full network graph.

Since the set of featured and associate objects may change based on the user's interactive specification, the system lays out the objects dynamically. The system lays out the objects in the dynamic network representation typically with at least one of three goals. First, since the purpose of the dynamic representation is to feature objects of interest, all of the objects provided in the second region may be visible at the same time. The system may address this object by using an unscrollable region for the dynamic network representation. The term unscrollable is intended to convey that since all objects depicted in the second region are depicted simultaneously, there is no need to provide a scrollable user interface. Second, just as the presence of associate objects may give the user some context to locate the featured objects in the network, the relative position of the objects may also provide useful visual cues. For this reason, the system may start the layout operation by placing all of the objects in statically defined locations, that is, the objects' effective locations if the static, hierarchical network graph were flattened to a single static graph. Finally, since the display region may be unscrollable, the original locations of the objects depicted in the second region may be too close together, even overlapping, or too far apart, leaving a lot of unused space. The system may handle this by performing an iterative algorithm that pushes the objects away from each other, while keeping cohesion along the edges of the graph fragments. The system may further uniformly size all or groups (e.g., featured objects, associate objects, etc.) of the vertex representations.

In a further embodiment, a zooming of the depicted objects may be performed to substantially fill a predefined area allocated to the second region. The objects may be rendered in the second region by spacing and sizing representations of the objects such that objects and edges do not overlap while the representations of the objects substantially fill a predetermined area of the second region.

Labeling of the representations of the objects depicted in the second region may be provided by retrieving labels associated with the objects from a database. A visual differentiation between featured and associate objects may be provided in the second region. An associate object in the second region may also be selected. In response to a selection of an associate object, a view in the first region of the object selected in the second region may be altered, for example by providing a zoomed view in the first region of the associate object selected in the second region.

The system may use the same visual representation for the individual vertices and edges that correspond to featured objects in the dynamic network representation as in the static network representation. For example, the static network representation may represent a network device by a color icon, and a network link, by a thick red line. If a corresponding device or link is featured in the dynamic representation provided in the second region, it may be shown with the same icon or line style to facilitate its identification in the dynamic representation. However, to distinguish between featured objects and associate objects, the dynamic network representation may represent associate objects by smaller gray-scale icons connected, for example, by a thin dashed black line.

BRIEF DESCRIPTION OF THE DRAWINGS

The invention is explained in further detail, and by way of example, with reference to the accompanying drawings wherein.

DETAILED DESCRIPTION

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the accompanying drawings, like reference numbers in different drawings designate similar elements.

The system and method described herein address problems in prior art systems. The method in accordance with the present system facilitates a user focusing on an arbitrary set of objects within a complex network by dynamically creating sub-graph fragments that may be placed together in a single visible region. In one embodiment, the method includes automatically laying out the sub-graph such that the individual vertices do not overlap yet still tend to keep their original relative positions. The objects depicted in the sub-graph may be depicted having a completely flattened hierarchy. The elements depicted in complex network view, such as a hierarchical network view, may represent subnets of the network while the objects depicted in the sub-graph may represent individual routers.

Figure 1:
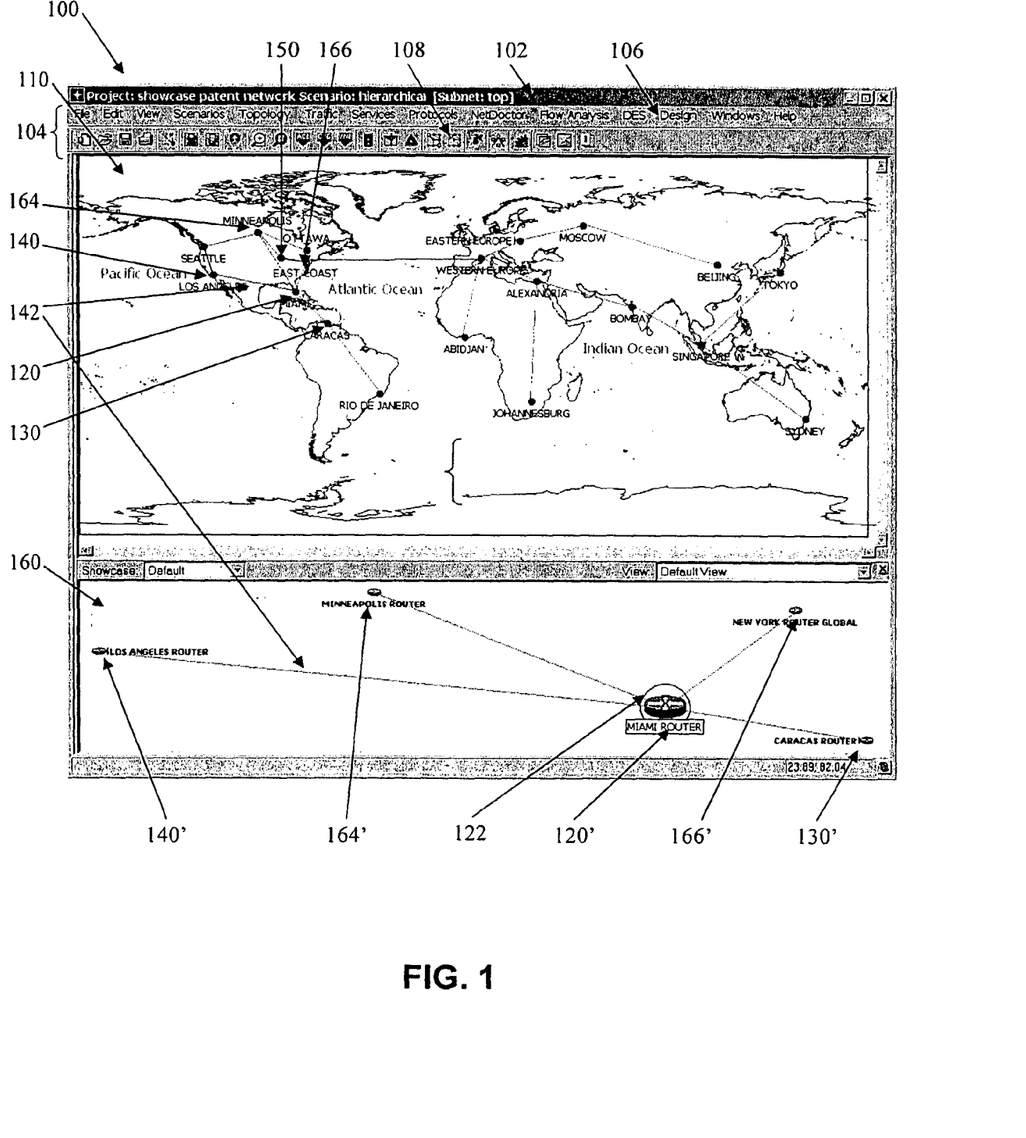
FIG. 1 shows an illustrative network visualization in accordance with an embodiment of the present system.

Further operation of the present system will be provided including a discussion of the visualization provided in FIG. 1 which shows an illustrative network visualization 100 in accordance with an embodiment of the present system. The visualization 100 is shown depicted in a typical UI including a windowing environment and as such, includes menu items such as a title bar 102 and a toolbar portion 104 having separated textual 106 and iconic 108 tool sections. The menu items may be typical of those provided in a windowing environment, such as may be represented within a Windows™ Operating System graphical UI as provided by Microsoft Corporation. The objects and sections of the visualization may be navigated utilizing a user input device, such as a mouse, trackball and/or other suitable user input. Further, the user input may be utilized for selecting items of interest as discussed further herein below.

The visualization 100 is illustratively shown having two separate display regions, a first region 110 (e.g., a static representation) and a second region 160 (e.g., a dynamic representation), each for providing a sub-graph of network interconnections in accordance with embodiments of the present system. The first region 110 may depict a sub-graph of an overall network, such as a static hierarchical sub-graph of a global network including regional networks. Illustratively, the regional networks are depicted as regional subnets such as MIAMI 120, CARACAS 130, LOS ANGELES 140, CHICAGO 150, MINNEAPOLIS 164 and others. The first region 110 may be presented as a hierarchical view or other view (e.g., flat) and may be utilized in accordance with the present system to select objects of interest and thereby, provide details of the objects of interest, such as details of network interconnections and devices. The second region 160 may provide a hierarchical view or flat view of selected objects, and/or associated objects of selected objects, and adjoining objects of those objects. In one embodiment, the second region 160 provides a completely flattened hierarchy of objects.

Figure 5:
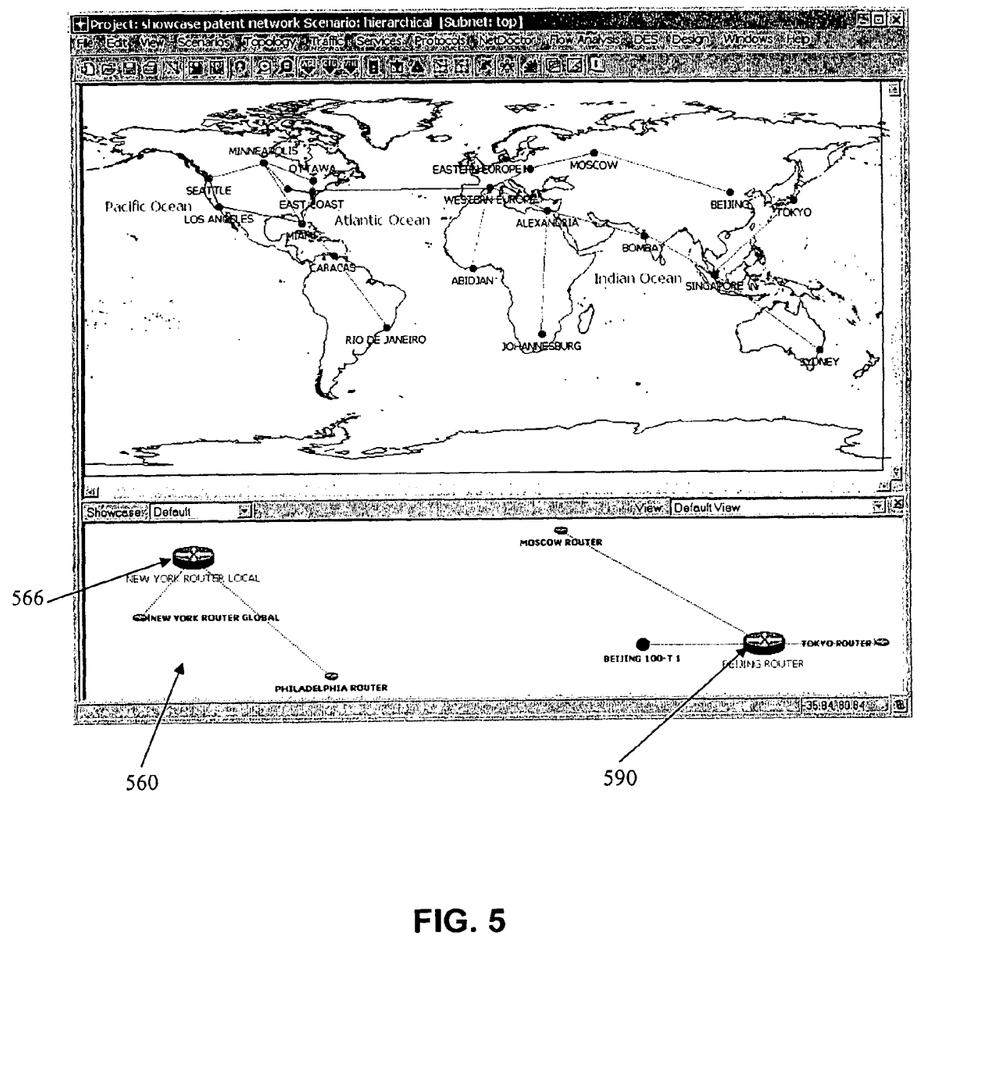
FIG. 5 shows details of a further network visualization in accordance with an embodiment of the present system.

The present system provides a means for displaying and interacting with a partial, but dynamic, representation of a network of objects in conjunction with a default, static representation. In operation, the display may be configured to show either representation or it may be split for example into a plurality of regions, each displaying one form of either representation. The static representation may display all of the network objects from a single network sub-graph as selectable vertices and edges. The dynamic representation may display some number of network objects from any of the statically defined sub-graphs, also as selectable vertices and edges, but not necessarily as a fully connected sub-graph. FIG. 5 shows such a sub-graph in a second region 560. The set of objects displayed in the dynamic representation consists of explicitly featured objects and implicitly-determined associate objects. The positioning of objects in the dynamic representation is automatically determined whenever the user features or unfeatures objects as discussed further herein below.

Figure 4:
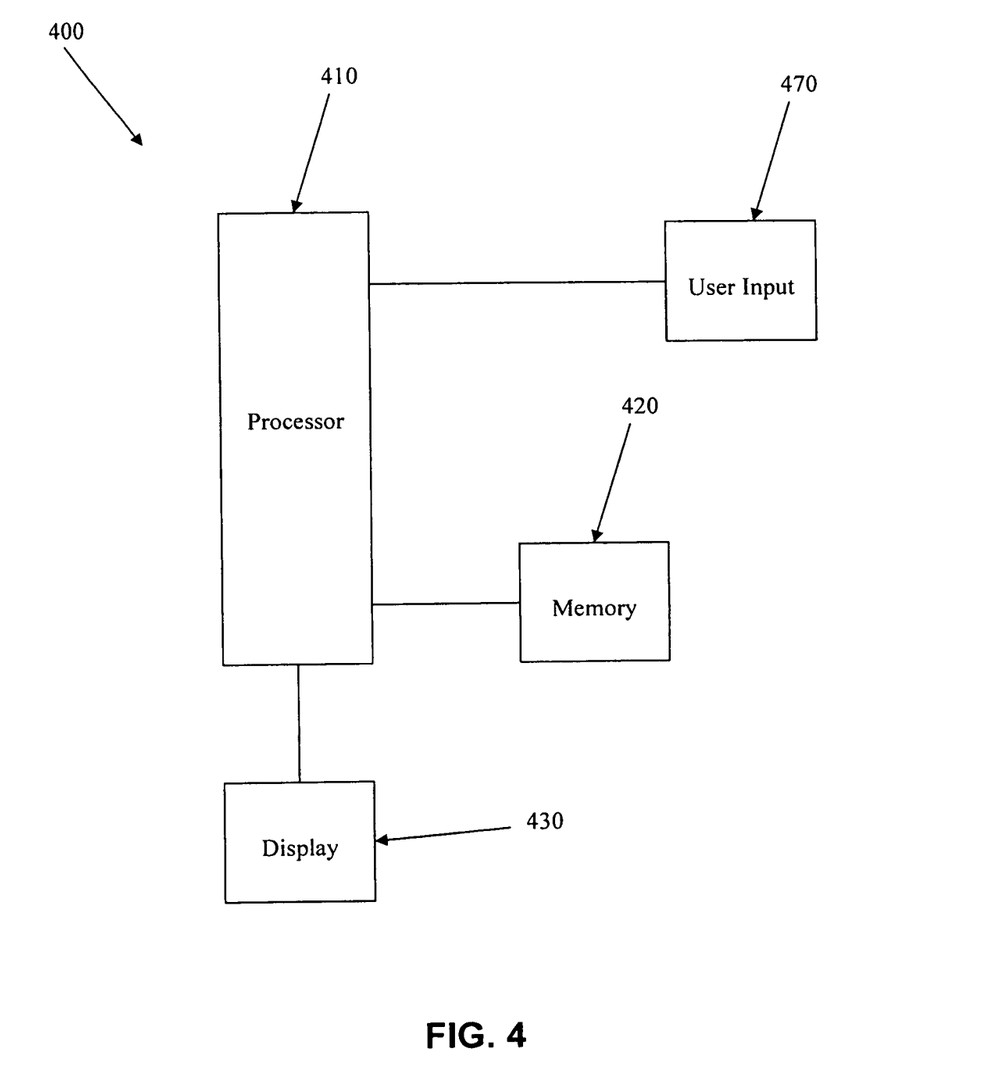
FIG. 4 shows a system for providing a network visualization in accordance with an embodiment of the present system.

Returning to FIG. 1, an object of interest and/or details of operation thereof may be selected utilizing the toolbar 104 and the user input (e.g., see, FIG. 4, user input 470). For example, the textual tool section 106, "View" menu item may be chosen to enable selection of a given network device for providing further details of the given network device as desired. In the same or further embodiments, particular items of interest may also be directly selectable through manipulation of the user input to position a cursor over an object of interest. In one embodiment, positioning of the cursor over an object for a period of time without further operation may result in the system providing additional information on the object, such as current status, load, etc. Thereafter, selection of the object indicating it is an object of interest may be initiated by the user manipulating a selection device, such as by depression one or more times of a mouse key (e.g., clicking, double-clicking, right-clicking, etc.) while the cursor is positioned over the object.

In these or other ways that would be readily apparent to a person of ordinary skill in the art, one or more objects of interest may be selected to determine objects that are depicted in the second region 160 as featured objects. A featured object may be an object associated with a selected object, such as a relationship of subnets to routers. A featured object may also be the selected object directly or another related object. Once one or more objects of interest are selected, the system in accordance with an embodiment may produce the second region 160 for visually depicting the featured objects and other objects to provide context for the featured objects. In one embodiment, the view of objects provided by the second region 160 may be a flat view wherein objects depicted in the second region 160 are flattened of any hierarchy.

Typically, the user decides which objects are to be featured in the second region 160. For example, the user may select one or more objects in the first region 110 and then run a featuring operation. Alternatively, the user may run some content-based selection operation and then feature the results. When the set of featured objects is changed, the system may automatically pick the set of associate objects based on its settings. For example, the system may be configured to consider the objects whose vertices are one edge away from the vertices of at least one featured object, as well as the objects represented by the connecting edges, as associate objects. A larger set of associate objects would result from considering objects at more than two or three edges away in the graph. By displaying associate objects and connecting them to the featured objects, the system provides a visual context to help the user understand where the featured objects belong in the sub-graphs. Further, by considering the connections between objects in different static sub-graphs of a hierarchical network graph, the system may provide the context within the full network graph depicted in the first region 110.

A first act, given that a set of one or more objects of interest have been selected, is for the system to grow that set to include one or more neighboring edges and vertices to provide the user context in the view depicted in the second region 160 to figure out a rough location of the corresponding featured object or objects in the overall network. For example, given a selected object, the system may also include edges that directly connect to a corresponding featured object's vertex as depicted in the first region 110 sub-graph and edges that would connect to the featured object's vertex provided that the global network graph were flattened.

In a case wherein it is desired (e.g., user-selected) or as a default option, the system may also include the vertices one hop away from a featured object, that is, those at the other end of the connecting edges. These objects may be included in the view provided in the second region 160 as secondary objects or associate objects. In general, the number of hops may be user-configured or set as a default from zero, for example, showing only the featured objects, to infinity, showing the entire network graph, illustratively after flattening the hierarchy. At each stage, objects are only included as associate objects if they have not already been included as either a primary object (e.g., corresponding to a selected object of interest such as a featured object) or a secondary object (e.g., directly or indirectly connected to a featured object such as an associate object).

In one embodiment in accordance with the present system, to visually differentiate between selected objects and other objects depicted when displayed in either or both of the first and second regions 110, 160, the selected objects and/or corresponding featured objects may be rendered differently from the associate (secondary) objects (e.g., objects which supply context). For example, the featured objects may be shown as one or more of full-size, in color, highlighted, as particular shapes, icons, etc. while the associate objects may be shown as one or more of a smaller size, in grayscale, as other particular shapes, icons, etc. Other ways of differentiating between feature objects and associate objects would readily occur to a person of ordinary skill in the art.

A further advantage of showing associate objects, such as neighboring objects, in an interactive environment is that the user may grow the set of objects of interest. For example, an associate object may be selected as a featured object, for example by double-clicking on an associate object. This gives the user the ability to quickly traverse the graph one hop at a time, providing more context with each extra portion of the graph's topology that is selected as a featured object.

Once the set of feature and associate objects is determined or is iteratively selected, the system in accordance with an embodiment of the present system depicts the corresponding objects in the second region 160. In operation, the system may locate the objects in the coordinate system of the entire network, such as the global network depicted in the first region 110. In accordance with the present system, this step may only be desirable if the system allows the various sub-graphs of the hierarchical network representation to use different coordinate systems.

Next, the system may perform a layout operation that moves the vertices of the objects away from each other such that the vertices become separated by some suitable minimum distance to enable depiction of the vertices and any other information that may be desirable, such as textual indications (e.g., labels) of the depicted objects.

Since the set of featured and associate objects may change based on the user's interactive specification, the system lays out the objects dynamically. The system lays out the objects in the dynamic network representation typically with at least one of three goals. First, since the purpose of the dynamic representation is to feature objects of interest, all of the objects provided in the second region should be visible at the same time. The system may address this object by using an unscrollable second region 160. The term unscrollable is intended to convey that since all objects depicted in the second region 160 may be depicted simultaneously, there is no need to provide a scrollable user interface. Second, just as the presence of associate objects may give the user some context to locate the featured objects in the network, the relative position of the objects may also provide useful visual cues. For this reason, the system may start the layout operation by placing all of the objects in statically defined locations, that is, the objects' effective locations if the static, hierarchical network graph were flattened to a single static graph. Finally, since the display region may be unscrollable, the original locations of the objects depicted in the second region may be too close together, even overlapping, or too far apart, leaving a lot of unused space. The system may handle this by performing an iterative algorithm that pushes the objects away from each other, while keeping cohesion along the edges of the graph fragments. The system may further uniformly size all or groups (e.g., featured objects, associate objects, etc.) of the vertex representations.

In one embodiment, the system may perform an iterative algorithm that treats each vertex as a circle with a specified radius. A force-like vector may be calculated for each vertex based on the relative repulsion of neighboring vertices and the relative cohesion of edges. The system may thereafter accordingly adjust each vertex's location depicted in the second region 160 while maintaining a relative positioning of the objects and edges. Positioning of the vertexes may also be adjusted to avoid an overlap of depicted edges, objects, labels, etc. After the layout operation, the system may calculate a bounding rectangle around the vertices, edges, etc. and adjust the displayed zoom level of the vertices so that the bounding rectangle fills up the available visual space. The zooming operation may take into account an amount of visual area allocated to the second region 160, either as a default or user-selectable option.

In a further embodiment, the system may perform an automatic sizing of the depicted objects (e.g., icons) so that icons, for example, don't visually overlap each other. Further, the system may perform a label placement algorithm such that name labels are only drawn if they may be placed in such a way that the labels do not overlap each other or any of the icons and/or label portions may be selected to avoid overlap. For example, for a label such as "MIAMI ROUTER" a label portion "MIAMI R." may be selected to avoid overlap. Other systems for laying out the objects depicted in the second region 160 would readily occur to a person of ordinary skill in the art.

A visualization of primary (feature) and secondary (associate) objects is depicted in the second region 160. In the example shown, MIAMI 120 is selected in the primary region 110. A corresponding feature object MIAMI ROUTER 120' is determined in accordance with the present system. Neighboring associate objects are depicted that are one-hop (e.g., connected to the feature object by one-edge) away, such as associate object LOS ANGELES ROUTER 140', MINNEAPOLIS ROUTER 164', NEW YORK ROUTER GLOBAL 166', and CARACAS ROUTER 130'. For example, the feature object MIAMI ROUTER 120' is shown separated by one edge 142 from the associate object LOS ANGELES ROUTER 140'. As discussed previously, a visual indication of whether an object is a feature object or an associate object may be provided by the size of the representation depicted for the object. In the example shown, all objects are depicted by circular shapes, but the feature object is depicted by a larger circular shape than the associate objects. Further, the primary object may have an indication, such as indication 122 illustratively shown encircling the MIAMI ROUTER 120'. The featured object may also be shown in color while the associate objects are shown as grayscale objects. In other embodiments, the feature and associate objects may be depicted by different shapes, the indication 122 may be rendered as an underlining of the feature object label, etc. Other ways of providing an indication differentiating between feature and associate objects would readily occur to a person of ordinary skill in the art.

Further, the indication 122 may alternatively indicate that the object is selected (e.g., clicked on once), but not necessarily yet selected to provide a corresponding feature object. The indication may alternatively be provided in either or both of the first or second regions 110, 160. However as should be clear from FIG. 1, the indication 122 may also indicate that an object is selected to provide the corresponding feature object.

A selected object may thereafter be acted on through operation of the toolbar portion 104, etc., for example to be added to the existing second region 160, to replace the existing second region 160, or to be added as an additional second region 160.

Figure 2A:
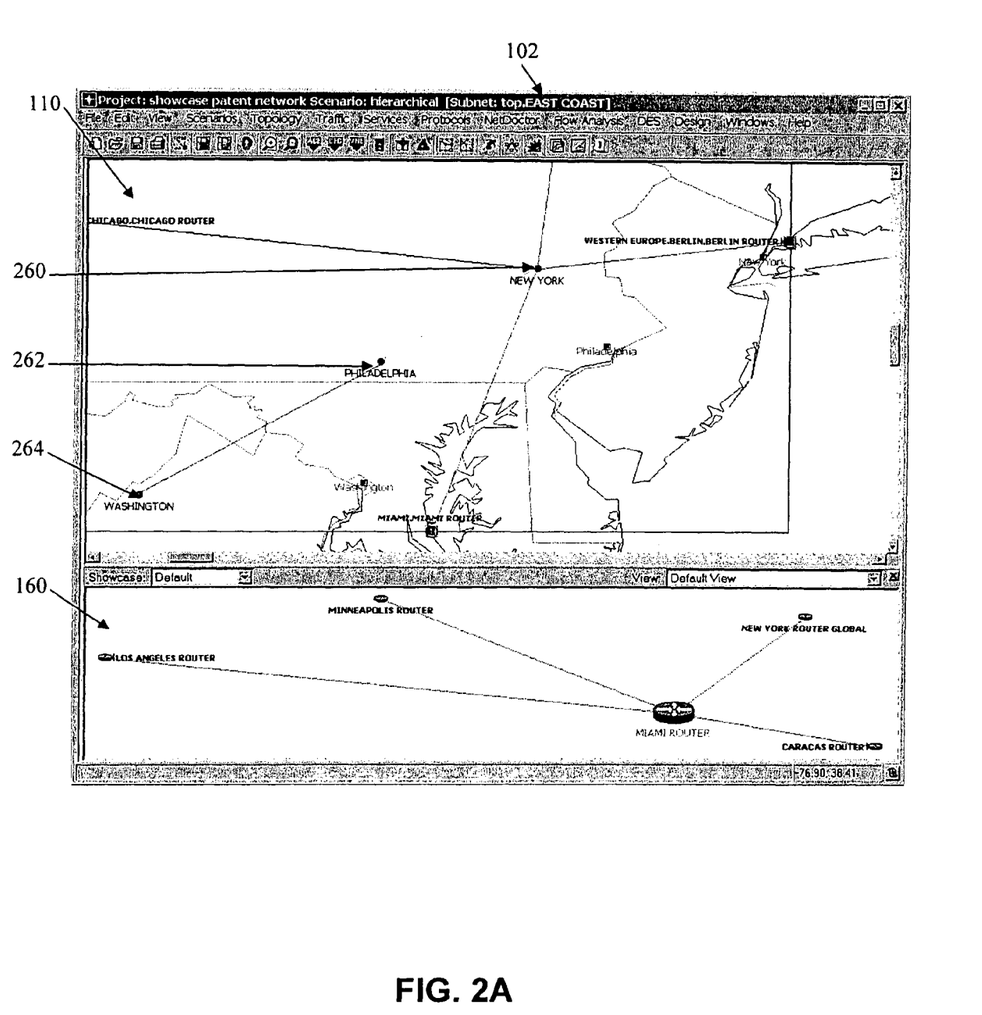
FIGS. 2A and 2B show further details of an illustrative network visualization in accordance with an embodiment of the present system.
Figure 2B:
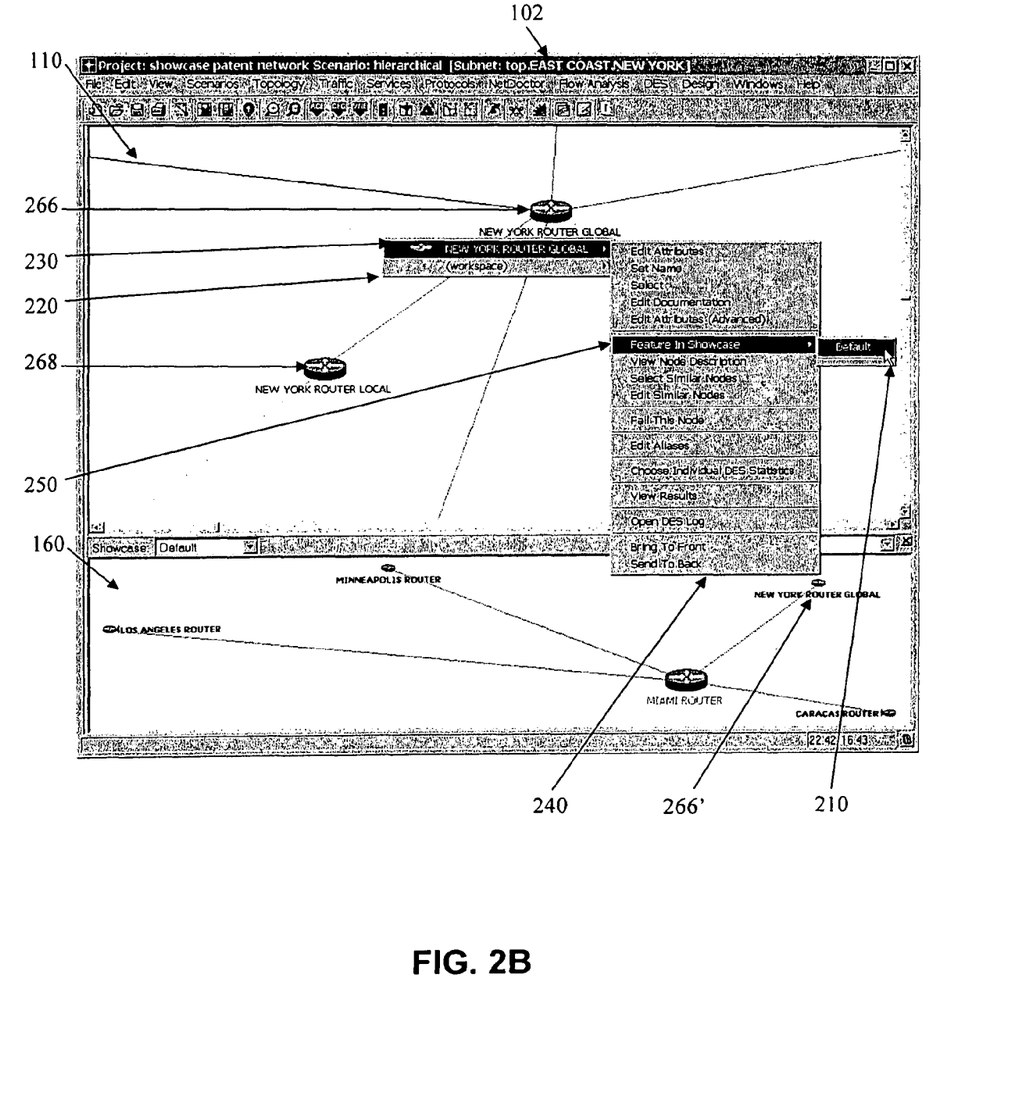

In one embodiment of the present system, a hierarchical network view provided by the first region 110 may be traversed to reveal more or less details of the network. For example, an EAST COAST subnet 166 depicted in the first region 110 of FIG. 1 may first be expanded via an input operation (e.g., a double click or menu operation). In response, the first region 110 may be updated to reveal finer details (e.g., the next lower level in the hierarchy) of the EAST COAST subnet 166 as depicted in FIG. 2A. Three new subnets, NEW YORK 260, PHILADELPHIA 262, and WASHINGTON 264 are then visible to the user. Further expansion of the NEW YORK subnet 260 may be performed in a similar fashion to produce a further updated first region 110 as depicted in FIG. 2B. NEW YORK ROUTER GLOBAL 266 and NEW YORK ROUTER LOCAL 268 are then shown in the first region 110. It should be understood that a user may, at any time, traverse back to a higher level of the hierarchy via one or more input operations. Furthermore, the title bar 102 may be continually updated to identify the level of the hierarchy that is presently viewable.

Figure 3:
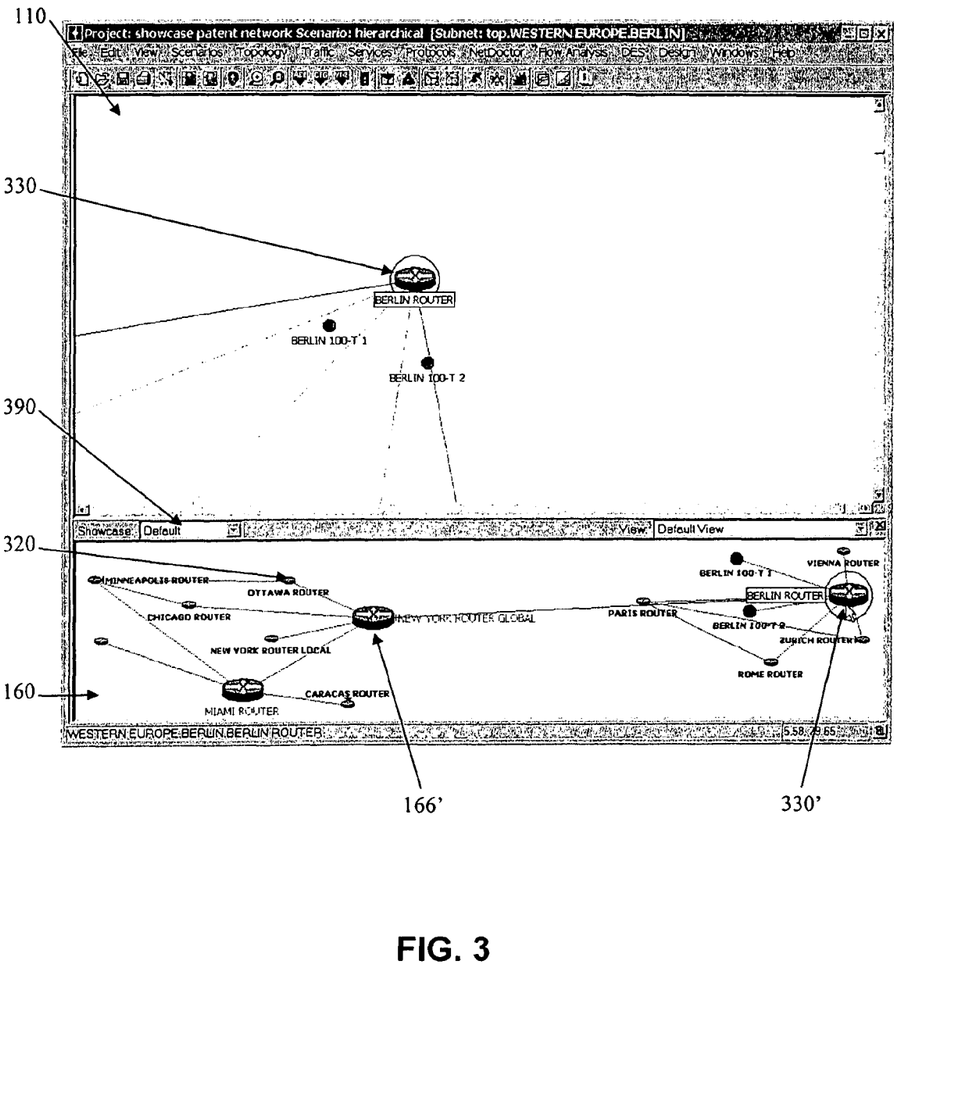
FIG. 3 shows still further details of an illustrative network visualization in accordance with an embodiment of the present system.

In another embodiment of the present system, feature objects may be added to the graph depicted in the second region 160. For example, NEW YORK ROUTER GLOBAL 266 may be selected in the first region 110 depicted in FIG. 2B. In one embodiment, a cursor, such as cursor 210 may be positioned over NEW YORK ROUTER GLOBAL 266 and a right mouse click, as is readily understood by a person of ordinary skill in the art, may result in a pop-up menu 220, such as a showcase object menu. Similar menu operation may occur by right mouse clicking an object in the second region 160. Positioning the cursor 210 over a "NEW YORK ROUTER GLOBAL" menu item 230 and pausing for a period of time may result in a secondary pop-up menu 240. Selection of a "Feature In Showcase" secondary menu item 250 may result in the depiction of the NEW YORK GLOBAL ROUTER 166' in the second region 160 changing to indicate that it is now a feature object as depicted in FIG. 3. In addition, associate objects that are one-hop away from the NEW YORK GLOBAL ROUTER 166', such as an OTTAWA ROUTER 320, may also now be automatically added to the graph as shown in the second region 160 of FIG. 3.

It should be noted that the secondary pop-up menu 240 in FIG. 2B may also be utilized to add an object, such as the NEW YORK GLOBAL ROUTER 166', to a further second region 160 other than the second region 160 depicted in the figures. In this way, objects may be added to any of a potential plurality of existing second regions, illustratively termed "SHOWCASES", or may be utilized for creating further second regions. The plurality of second regions may be utilized, for example, to enable a comparison between the plurality of second regions.

Through various user actions such as menu selections, new and/or duplicate second regions (showcases) may be created for comparison purposes. When multiple second regions are desired, a user in selecting an object as a feature object may then select which second region (showcase) will be utilized to depict the selected feature object. The depictions provided in the second region 160 may be provided a label 390, as shown in FIG. 3, to facilitate differentiation between the depictions. In another embodiment in accordance with the present system, a second region may be separated (e.g., undocked) from the first region, thereby allowing the user to view multiple showcases simultaneously if desired.

Figure 6:
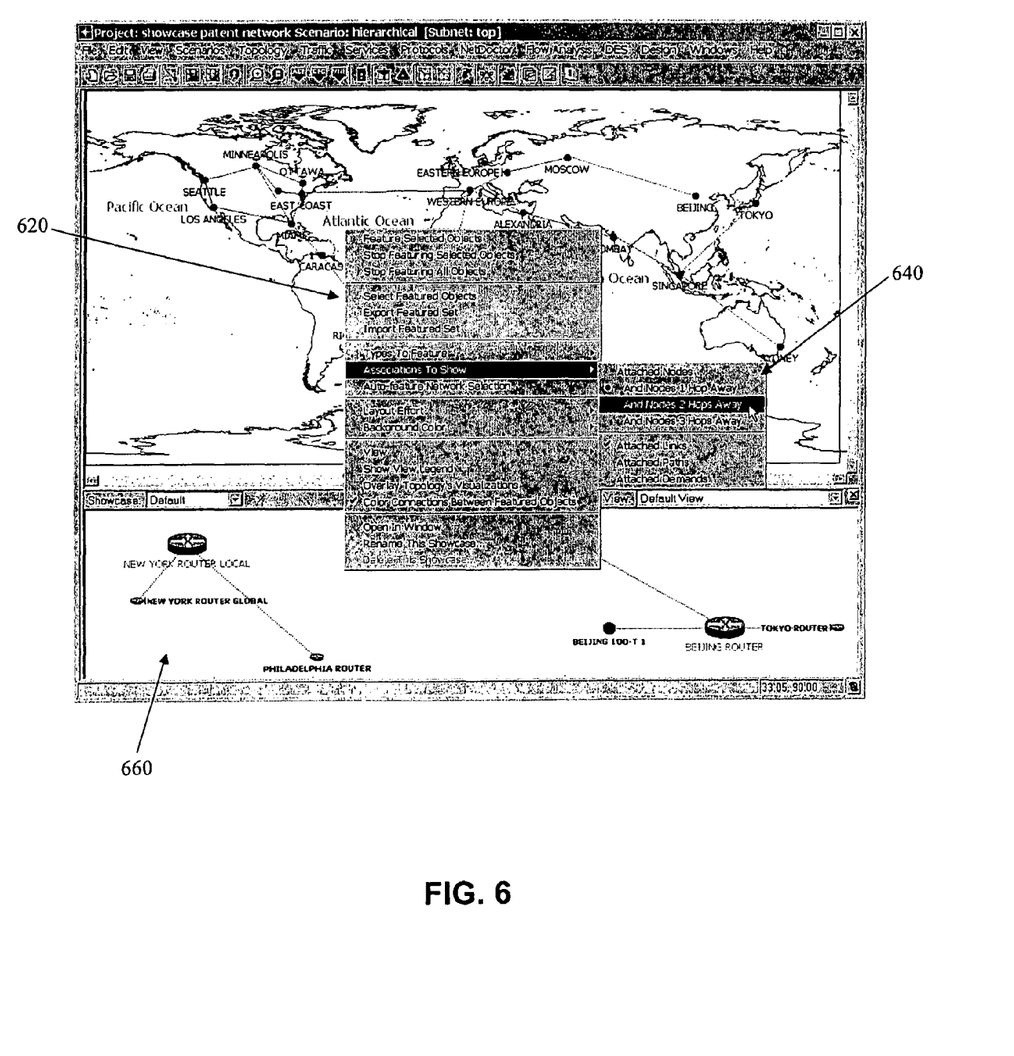
FIG. 6 shows further illustrative menu structures in accordance with an embodiment of the present system.

In one embodiment depicted in FIG. 6, a pop-up menu 620, such as a showcase menu may appear in response to a right mouse click on an empty area within the second region 660. Pausing a cursor over a menu item may cause a secondary pop-up window 640.

In the same or further embodiments, additional feature objects may also be selected by directly interacting with objects in the second region 160. For example, instead of traversing the hierarchical network view in the first region 110 to feature the NEW YORK ROUTER GLOBAL 266, the associate object NEW YORK ROUTER GLOBAL 266' can be interacted with (e.g., double-clicked) to easily feature that object. This gives the user the ability to quickly traverse the graph one hop at a time, providing more context with each extra portion of the graph's topology that is selected as a featured object.

As previously discussed, selection of objects in the first region 110, such as depicted in FIG. 1, may result in a change in the displayed objects in the second region 160. In accordance with the present system, selection of an object in the second region 160 may also result in a change in the first region 110 display. For example, the selection of the BERLIN ROUTER 330' in the second region 160 depicted in FIG. 3 may result in BERLIN ROUTER 330 being shown in a zoomed-in (i.e., lower hierarchical level) view within the first region 110 as depicted in of FIG. 3.

As discussed, in one embodiment the specification of the feature objects may be made directly by the user, for example by the user finding and selecting the objects elsewhere in the user interface. In another embodiment, the objects may be selected indirectly, for example in response to an operation that identifies a point of interest in response to another operation. For example, a feature object may be selected in response to a calculation of a point-to-point path across the network. The calculation of the point-to-point path may result in one or more of the objects along and/or terminating the point-to-point path to become feature objects. Also, the names or identifiers of the feature objects may be written to and read from any type of auxiliary data file or may be stored together with the objects. As with the full network's visual representation as depicted in the first region 110, the reduced visual representation depicted in the second region 160 may be annotated with various types of information presented in tooltips, popup windows, etc.

Other indirect methods of selecting objects would readily occur to a person of ordinary skill in the art. For example, objects that meet certain criteria may also be indirectly selected (filtered) as feature objects. This filtering operation may include criteria such as a particular geographic location; a range of Internet Protocol (IP) addresses; an object type by classification, model, protocol, etc.; an object's supported services; whether an object is over/under utilized; whether an object has failed; whether an object has more than an average or predetermined number of collisions, retransmissions, etc. In one embodiment, objects may be selected based on a relationship to other objects. In this embodiment, one or more objects may be selected as feature objects based on, for example, traffic flow going through a selected further object, such as a network link. Objects may also be selected as a result of other analysis or simulation results. For example, objects may be selected through non-user input from an analysis or simulation engine.

Other modes of operation may also be suitably employed. For example, in one mode in accordance with the present system, an object selected (e.g., clicked on once) in the first region 110, may be immediately featured in the second region 160 without further user interaction. In this mode of operation, a selection of MIAMI 120 in the first region 110 may result in the second region 160 being cleared except for MIAMI ROUTER 120' which may be presented as a feature object. As should be clear, the second region 160 may also include connected secondary objects, for example, as shown in FIG. 1. In this mode of operation, a selection of a further object, will result in the second region 160 again being cleared with only the further object featured. Additionally, in this mode of operation, objects may be added to the second region 160 instead of replacing the existing objects by performing a further selection operation, such as holding down the "Ctrl Key" on a keyboard while selecting the further object with a mouse click. In this case, both MIAMI ROUTER 120' and the further object, for example, may be featured. This mode of operation may provide a fast way for featuring a single object as well as a plurality of objects.

FIG. 5 shows such a sub-graph as a second region 560 where a feature object 566 (NEW YORK ROUTER LOCAL) is "joined" by a feature object 590 (BEIJING ROUTER). It may be noted that NEW YORK ROUTER LOCAL is not depicted joined to BEIJING ROUTER in FIG. 5. Optionally when a plurality of featured objects are not joined for example by a setting of depicting associate objects one hop away, the feature objects may be depicted as separate (e.g., not joined directly or otherwise). In one embodiment, an option may determine that feature objects are always depicted joined to other feature objects of the second region.

FIG. 4 shows a device 400 in accordance with an embodiment of the present system. The device has a processor 410 operationally coupled to a memory 420, a display 430, and a user input device 470. The memory 420 may be any type of device for storing application data as well as other data, such as object data, coordinate data for objects, label data for objects, interconnectivity of objects, etc. The application data and other data are received by the processor 410 for configuring the processor 410 to perform operation acts in accordance with the present system. The operation acts include controlling at least one of the display 430 to display content such as the first and second regions 110, 160. The user input 470 may include a keyboard, mouse, trackball or other devices, including touch sensitive displays, which may be stand alone or be a part of a system, such as part of a personal computer, personal digital assistant, or other display device for communicating with the processor 410 via any type of link, such as a wired or wireless link. Clearly the processor 410, memory 420, display 430 and/or user input device 470 may all or partly be a portion of a computer system or other device.

The methods of the present system are particularly suited to be carried out by a computer software program, such program may contain modules corresponding to the individual steps or acts of the methods. Such program may of course be embodied in a computer-readable medium, such as an integrated chip, a peripheral device or memory, such as the memory 420 or other memory coupled to the processor 410.

The computer-readable medium and/or memory 420 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used as the computer-readable medium and/or memory 420.

Additional memories may also be used. The computer-readable medium, the memory 420, and/or any other memories may be long-term, short-term, or a combination of long-term and short-term memories. These memories configure processor 410 to implement the methods, operational acts, and functions disclosed herein. The memories may be distributed or local and the processor 410, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 420, for instance, because the processor 410 may retrieve the information from the network for operation in accordance with the present system.

The processor 410 and memory 420 may be any type of processor/controller and memory, such as those described in U.S. 2003/0057887, which is incorporated herein by reference as if set out in entirety herein. The processor 410 is capable of providing control signals and/or performing operations in response to input signals from the user input device 470 and executing instructions stored in the memory 420. The processor 410 may be an application-specific or general-use integrated circuit(s). Further, the processor 410 may be a dedicated processor for performing in accordance with the present system or may be a general-purpose processor wherein only one of many functions operates for performing in accordance with the present system. The processor 410 may operate utilizing a program portion, multiple program segments, or may be a hardware device utilizing a dedicated or multi-purpose integrated circuit.

Of course, it is to be appreciated that any one of the above embodiments or processes may be combined with one or more other embodiments or processes or be separated in accordance with the present system.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A system comprising:
a display,
a user input device, and
a processor that is configured to provide a user interface for displaying a visual representation of a network of objects on the display, and to receive user input identifying one or more selected objects of the network of objects and determining therefrom a set of display objects based on the selected objects,
wherein the representation includes:
a first region that includes a plurality of selectable objects of the network of objects, wherein each of the plurality of selectable objects are depicted having a given positioning relative to each other of the plurality of selectable objects, and one or more edges interconnecting the plurality of selectable objects; and
a second region that is configured to display only the display objects, the display objects including feature objects corresponding to the selected objects that are depicted in the second region based on the given relative positioning of the corresponding selected objects in the first region, so that the selected objects are depicted in the second region in substantially similar locations relative to each other as in the first region.

2. The system of claim 1, wherein the display objects include a number of additional objects from a database that indicates objects that are adjoining the corresponding feature objects, and the processor is configured to position the adjoining objects in the second region without substantially changing the given relative positioning of the corresponding feature objects, wherein the additional objects are depicted in the second region interconnected to the corresponding feature objects by one or more edges.

3. The system of claim 2, wherein the number of additional objects retrieved is configurable to include objects that are one or more hops from the corresponding feature objects.

4. The system of claim 2, wherein the processor is configured to render the corresponding feature objects visually distinguishable from the additional objects by at least one of a color difference, a shape difference, and a size difference.

5. The system of claim 2, wherein the display objects in the second region are selectable.

6. The system of claim 1, wherein the objects depicted in the first region are presented in a hierarchical view and the display objects depicted in the second region are presented in a flat view.

7. The system of claim 1, wherein the objects depicted in the first region are configured to be selectable in response to a point-to-point path calculation.

8. The system of claim 1, wherein the first region and second region are presented simultaneously after the one or more selectable objects are selected.

9. The system of claim 1, wherein the objects presented in the second region are selectable and wherein the processor is configured to provide a zoomed-in view of an object in the first region corresponding to an object selected in the second region.

10. An application embodied on a non-transient computer readable medium configured to produce a user interface of a device for displaying a representation of a network of objects, the application comprising:
a portion configured to render a plurality of selectable objects, wherein each of the plurality of selectable objects are rendered having a given positioning relative to each other of the plurality of selectable objects, and one or more edges interconnecting the plurality of selectable objects within a first region of the user interface;
a portion configured to receive user input identifying one or more selected objects of the plurality of selectable objects;
a portion configured to determine a set of display objects based on the selected objects, including one or more feature objects corresponding to the display objects; and
a portion configured to render a second region in response to one or more of the selectable objects of the first region being selected, wherein only the display objects are depicted in the second region, and the feature objects are depicted in the second region based on the relative positioning of the feature objects in the first region, so that the feature objects are depicted in the second region in substantially similar locations relative to each other as in the first region.

11. The application of claim 10, wherein the portion configured to determine the set of display objects is configured to retrieve the feature object and a number of additional objects from a database that indicates objects that are adjoining the feature object, and is configured to position the adjoining objects in the second region without substantially changing the given relative positioning of the feature objects, wherein the number of additional objects rendered in the second region are interconnected to the feature objects by one or more edges.

12. The application of claim 10, wherein the portion configured to render the second region is configured to render the feature objects by performing an iterative process that treats each of the feature objects as repulsing each other of the feature objects, which repulsion is partially counteracted by a relative cohesion provided by edges that adjoin the feature objects, and thereafter zooming the feature objects to substantially fill a predefined area allocated to the second region.

13. The application of claim 10, wherein the portion configured to render the second region is configured to render the feature objects by spacing and sizing representations of the feature objects such that feature objects and edges do not overlap while the representations of the feature objects substantially fill a predetermined area of the second region.

14. The application of claim 13, comprising a portion that is configured to label the representations of the feature objects by retrieving labels associated with the feature objects.

15. The application of claim 11, comprising a portion that is configured to provide a visual differentiation between the feature and the additional objects.

16. The application of claim 10, comprising a portion configured to enable selection of one or more of the display objects in the second region.

17. The application of claim 16, wherein the portion configured to enable selection of the display object in the second region is configured to alter a view in the first region of an object corresponding to the object selected in the second region.

18. A method of producing a user interface of a device for displaying a visual representation of a network of objects, the method comprising:

rendering, at the device, a plurality of selectable objects having a given positioning relative to each other of the plurality of selectable objects;

rendering, at the device, one or more edges interconnecting the plurality of selectable objects within a first region of the user interface;

receiving, via the user interface, user input identifying one or more selected objects of the plurality of selectable objects;

determining, by the user interface, a set of display objects based on the one or more selected objects, including feature objects corresponding to the selected objects; and rendering, at the device, a second region in response to a selectable object of the first region being selected, wherein only the display objects are depicted in the second region, and the selected objects are depicted in the second region based on the relative positioning of the selected objects in the first region, so that the select objects are depicted in the second region in substantially similar locations relative to each other as in the first region.

19. The method of claim 18, wherein determining the set of display objects includes retrieving a number of additional objects from a database that indicates objects that are adjoining the selected object in response to the selection of the selected object and positioning the number of additional objects in the second region without substantially changing the given relative positioning of the feature object; and interconnecting the number of additional objects and the feature object rendered in the second region by one or more edges.

20. The method of claim 18, including:

enabling selection of one or more of the display objects in the second region; and altering a view in the first region of one or more objects corresponding to the one or more display objects selected in the second region.

\* \* \* \* \*